(12) United States Patent  (10) Patent No.: US 8,810,819 B2
Kamoi et al.  (45) Date of Patent: Aug. 19, 2014

(54) IMAGE FORMING SYSTEM, IMAGE FORMING DEVICE, IMAGE FORMING METHOD, AND NON-TRANSITORY COMPUTER READABLE MEDIUM

(75) Inventors: Yusuke Kamoi, Kanagawa (JP); Yoshinori Ando, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 45 days.

(21) Appl. No.: 13/482,305

(22) Filed: May 29, 2012

(65) Prior Publication Data

US 2013/0100472 A1 Apr. 25, 2013

(30) Foreign Application Priority Data

Oct. 24, 2011 (JP) ................. 2011-233173

(51) Int. Cl.
*G06K 15/02* (2006.01)
*H04N 1/32* (2006.01)
*H04N 1/00* (2006.01)

(52) U.S. Cl.
CPC ....... *H04N 1/00347* (2013.01); *H04N 1/32635* (2013.01); *H04N 2201/001* (2013.01); *H04N 2201/0072* (2013.01); *H04N 1/32363* (2013.01); *H04N 1/32523* (2013.01); *H04N 2201/0039* (2013.01); *H04N 1/32646* (2013.01); *H04N 2201/3297* (2013.01); *H04N 1/32448* (2013.01); *H04N 1/32539* (2013.01)
USPC ............... 358/1.13; 358/1.16; 358/404

(58) Field of Classification Search
USPC ........ 358/1.1, 1.13, 1.16, 400, 401, 403, 404, 358/444
See application file for complete search history.

(56) References Cited

U.S. PATENT DOCUMENTS

2003/0234958 A1* 12/2003 Fritz et al. ................. 358/1.16
2004/0054656 A1* 3/2004 Leung et al. ................ 707/1
2004/0252322 A1 12/2004 Gassho et al.

FOREIGN PATENT DOCUMENTS

| JP | A-2000-6476 | 1/2000 |
| JP | A-2000-156760 | 6/2000 |
| JP | A-2003-305928 | 10/2003 |
| JP | A-2004-171342 | 6/2004 |

* cited by examiner

*Primary Examiner* — Thomas D Lee
(74) *Attorney, Agent, or Firm* — Oliff PLC

(57) ABSTRACT

An image forming system includes plural image forming devices each of which forms an image corresponding to image data. Each image forming device includes a memory, a determining unit, a selecting unit, a specifying unit, and a transferring unit. The memory stores one or more pieces of image data. The determining unit determines whether or not usage of the memory is larger than a threshold. The selecting unit selects, if the determining unit determines that usage of the memory is larger than the threshold, a piece of image data to be transferred from among the pieces of image data stored in the memory. The specifying unit specifies a specific image forming device to which the selected piece of image data is to be transferred among the other image forming devices. The transferring unit transfers the selected piece of image data to the specific image forming device.

7 Claims, 14 Drawing Sheets

FIG. 4

| USER ID | REFERENCE IP ADDRESS |
|---|---|
| User01 | 192.168.227.101 |
| User01 | 192.168.227.102 |
| User01 | 192.168.227.103 |
| User01 | 192.168.227.104 |
| User01 | 192.168.227.105 |
| User01 | 192.168.227.106 |
| User01 | 192.168.16.110 |
| User02 | 192.168.227.102 |
| User02 | 192.168.227.104 |
| User03 | 192.168.227.105 |
| User03 | 192.168.227.110 |

| PDL ID | USER ID | IP ADDRESS | PDL STORAGE REGION | DATE SIZE (Kb) | NUMBER OF OUTPUTS | LATEST OUTPUT TIME | REMOTE OUTPUT INSTRUCTION FROM ANOTHER DEVICE |
|---|---|---|---|---|---|---|---|
| 0001 | User01 | 192.168.227.101 | .../PDL-A | 512 | 15 | 9/6/2011 11:00 | 192.168.227.102 [10 TIMES] 192.168.227.110 [3 TIMES] |
| 0002 | User01 | 192.168.227.101 | .../PDL-B | 1024 | 5 | 9/2/2011 11:20 | 192.168.227.104 [TWICE] |
| 0003 | User01 | 192.168.227.101 | .../PDL-C | 8192 | 3 | 9/5/2011 20:00 | 192.168.227.103 [ONCE] |
| 0004 | User02 | 192.168.227.102 | .../PDL-Z | 2048 | 5 | 9/6/2011 11:15 | 192.168.227.101 [3 TIMES] |

| IP ADDRESS | USAGE (Kb) | FAX FUNCTION | OPERATING TIME | NUMBER OF OUTPUTS |
|---|---|---|---|---|
| 192.168.227.102 | 3.840 | EFFECTIVE | 1:00 | 5 |
| 192.168.227.103 | 2.048 | INEFFECTIVE | 2:00 | 5 |
| 192.168.227.104 | 1.024 | EFFECTIVE | 1:15 | 20 |
| 192.168.227.105 | 2.048 | EFFECTIVE | 1:30 | 10 |
| 192.168.227.106 | 2.048 | EFFECTIVE | 5:00 | 10 |
| 192.168.16.110 | 1.024 | EFFECTIVE | 0:05 | 5 |

FIG. 15

| PDL ID | USER ID | IP ADDRESS | PDL STORAGE REGION | DATE SIZE (Kb) | NUMBER OF OUTPUTS | LATEST OUTPUT TIME | REMOTE OUTPUT INSTRUCTION FROM ANOTHER DEVICE |
|---|---|---|---|---|---|---|---|
| 0001 | User01 | 192.168.227.104 | .../PDL-A | 512 | 15 | 9/6/2011 11:00 | 192.168.227.102 [10 TIMES] 192.168.227.110 [3 TIMES] |
| 0002 | User01 | 192.168.227.104 | .../PDL-B | 1024 | 5 | 9/2/2011 11:20 | 192.168.227.104 [TWICE] |
| 0003 | User01 | 192.168.227.101 | .../PDL-C | 8192 | 3 | 9/9/2011 20:00 | 192.168.227.103 [ONCE] |
| 0005 | User01 | 192.168.227.101 | .../PDL-D | 1024 | 1 | 9/6/2011 17:00 | – |
| 0004 | User02 | 192.168.227.102 | .../PDL-Z | 2048 | 5 | 9/6/2011 11:15 | 192.168.227.101 [3 TIMES] |

IMAGE FORMING SYSTEM, IMAGE FORMING DEVICE, IMAGE FORMING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2011-233173 filed Oct. 24, 2011.

BACKGROUND (i) Technical Field

The present invention relates to an image forming system, an image forming device, an image forming method, and a non-transitory computer readable medium.

(ii) Related Art

There is known a technique of suppressing the occurrence of suspension of image formation due to insufficient storage capacity when an image forming device does not have sufficient storage capacity for storing image data.

SUMMARY

According to an aspect of the invention, there is provided an image forming system including plural image forming devices each of which forms an image corresponding to image data. Each of the plural image forming devices includes a memory, a determining unit, a selecting unit, a specifying unit, and a transferring unit. The memory stores one or more pieces of image data. The determining unit determines whether or not usage of the memory of the image forming device is larger than a threshold. The selecting unit selects, if the determining unit determines that usage of the memory is larger than the threshold, a piece of image data to be transferred from among the pieces of image data stored in the memory. The specifying unit specifies a specific image forming device to which the piece of image data selected by the selecting unit is to be transferred among the other image forming devices. The transferring unit transfers the piece of image data selected by the selecting unit to the specific image forming device specified by the specifying unit.

BRIEF DESCRIPTION OF THE DRAWINGS

An exemplary embodiment of the present invention will be described in detail based on the following figures, wherein:

FIG. 4 is a diagram illustrating an example of a reference IP address;

FIG. 6 is a diagram illustrating an example of PDL storage information;

FIG. 13 is a diagram illustrating an example of device information;

FIG. 15 is a diagram illustrating PDL storage information after PDL data has been transferred.

DETAILED DESCRIPTION

Exemplary Embodiment

Hereinafter, an exemplary embodiment of the present invention will be described with reference to the drawings.

Figure 1:
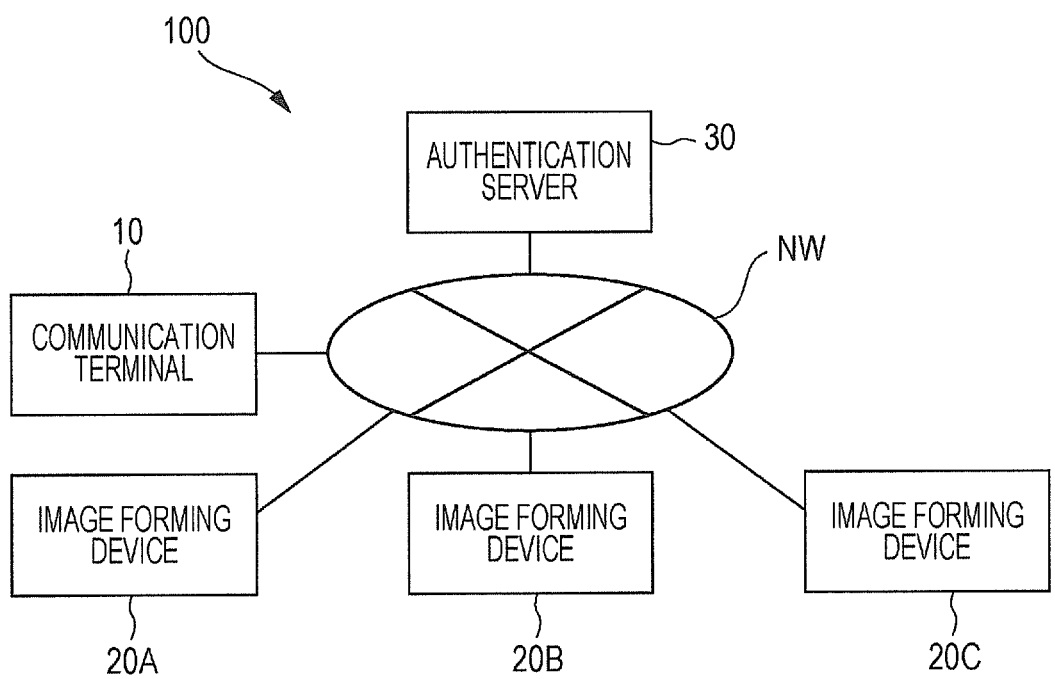
FIG. 1 is a block diagram illustrating the configuration of an image forming system.

FIG. 1 is a block diagram illustrating the configuration of an image forming system 100 according to an exemplary embodiment of the present invention. The image forming system 100 includes a communication terminal 10, image forming devices 20A, 20B, and 20C, an authentication server 30, and a network NW. When it is not necessary to distinguish the image forming devices 20A, 20B, and 20C from one another, each of them will be referred to as an image forming device 20. The number of image forming devices 20 is not limited to three, and the number of communication terminals 10 is not limited to one. The network NW is a communication network, including a mobile communication network, such as a mobile phone network or a wireless local area network (LAN), and a fixed communication network, such as the Internet.

The communication terminal 10 is a communication terminal capable of communicating with the image forming devices 20, such as a mobile phone, a wireless terminal accessible to a wireless LAN, or a personal computer (PC) having a communication function. In the example illustrated in FIG. 1, the communication terminal 10 is a PC. Each of the image forming devices 20 is, for example, an electrophotographic printer. The image forming device 20 has a storage region for storing page description language (PDL) data received from the communication terminal 10. Here, PDL data is data regarding printing that is to be performed in response to an instruction provided by a user using the communication terminal 10, and includes a user ID for identifying the user, image data in which an image to be printed is expressed in a PDL format, time information indicating the time when the instruction was provided, etc. Here, printing includes forming an image using electrophotography. The PDL data may include document data and so-called intermediated data that is created during processing, as well as image data. Information for identifying each image forming device 20 is represented by, for example, a name or an Internet protocol (IP) address assigned to the image forming device 20. The authentication server 30 is a server device that stores pairs of a user ID and a password, and PDL storage information, which includes pieces of information regarding pieces of PDL data stored in the individual image forming devices 20.

Figure 2:
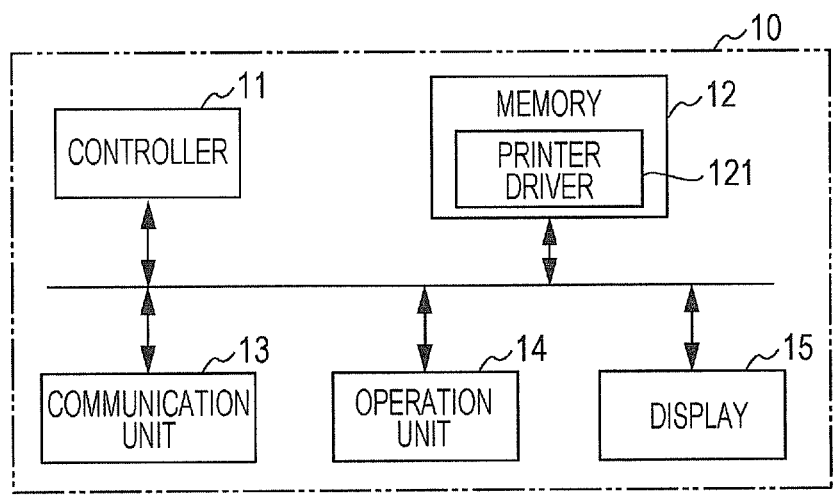
FIG. 2 is a block diagram illustrating the hardware configuration of a communication terminal.

FIG. 2 is a block diagram illustrating the hardware configuration of the communication terminal 10. The communication terminal 10 includes a controller 11, a memory 12, a communication unit 13, an operation unit 14, and a display 15. These units are electrically connected to one another via a bus. The controller 11 includes a central processing unit (CPU), a read only memory (ROM), a random access memory (RAM), and a timer that measures time. The CPU executes a control program stored in the ROM or the memory 12, thereby controlling the units connected to the controller 11.

The communication unit 13 communicates with the image forming devices 20 under the control performed by the controller 11. The operation unit 14 includes a mouse which receives a click operation and plural keys. When the mouse or any of the keys is operated by a user, the operation unit 14 supplies a signal to the controller 11 in accordance with the operation. The controller 11 determines the operation using the signal, and performs a process. The display 15 includes a display device such as a liquid crystal display, and a memory such as a video random access memory (VRAM), and displays various images on the liquid crystal display under the control performed by the controller 11. The memory 12 is a storage device such as a hard disk, and stores a control program, a threshold, and a printer driver 121, for example. The printer driver 121 is a program having a function of controlling the image forming devices 20.

In the printer driver 121, a user ID and spooler information are preset in association with each other. The spooler information indicates a storage region in which PDL data to be transmitted from the communication terminal 10 is stored. The spooler information includes an IP address assigned to each image forming device 20 and the name of each image forming device 20. For example, in the printer driver 121, a user ID "User001" and an IP address "192. 168. 227. 101" assigned to the image forming device 20A are set in association with each other. The spooler information set to the printer driver 121 may be changeable by a user using the operation unit 14.

Figure 3:
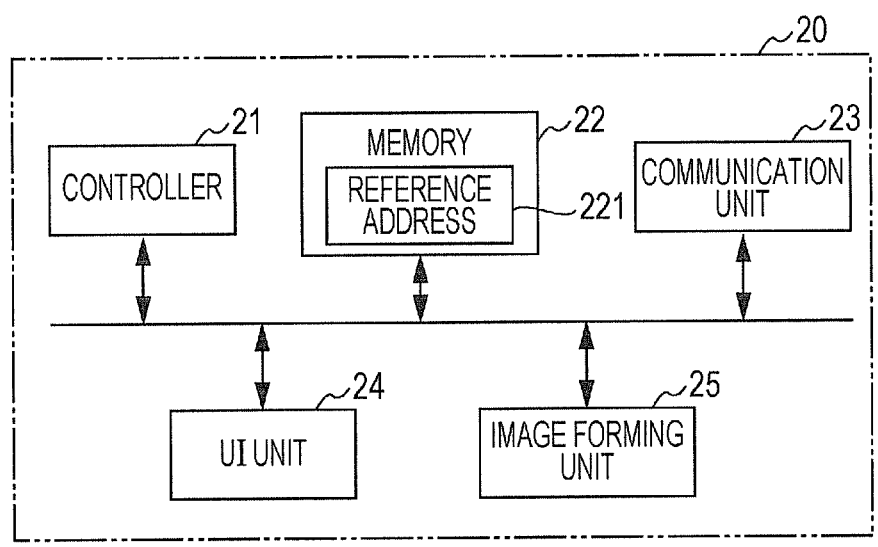
FIG. 3 is a block diagram illustrating the hardware configuration of an image forming device.

FIG. 3 is a block diagram illustrating the hardware configuration of the image forming device 20. The image forming device 20 is configured as a computer including a controller 21, a memory 22, a communication unit 23, a user interface (UI) unit 24, and an image forming unit 25. These units are electrically connected to one another via a bus. The controller 21 includes a CPU, a ROM, and a RAM. The CPU executes a control program stored in the ROM or the memory 22, thereby controlling the units connected to the controller 21. The communication unit 23 communicates with the communication terminal 10 and the authentication server 30 under the control performed by the controller 21. The UI unit 24 includes a touch screen and a key, for example. The UI unit 24 supplies a signal to the controller 21 in accordance with an operation performed by a user. The controller 21 determines the operation by using the signal, and, for example, executes a printing process or causes the touch screen to display an image. The image forming unit 25 forms an image corresponding to image data on a sheet. The memory 22 is a storage device such as a hard disk, and stores a control program and a reference address 221, for example. The reference address 221 is data in which individual users are associated with IP addresses of the image forming devices 20 that are permitted, by the image forming device 20 storing the reference address 221, to refer to the reference address 221. Here, "permitted to refer to" means that a certain image forming device 20 is allowed to communicate with another image forming device 20. The memory 22 is not limited to the one provided in the image forming device 20, and may be an externally attached hard disk or a universal serial bus (USB) memory, for example.

Each of the image forming devices 20 has operation modes including a normal mode and a power saving mode. In the normal mode, the image forming device 20 does not perform control to save power consumption. In the power saving mode, the image forming device 20 performs control to save power consumption. The operation mode of the image forming device 20 is set to the normal mode in a time period when a user is more likely to use the image forming device 20, for example, in the morning and during the daytime. When a predetermined time comes, which is included in a time period when a user is less likely to use the image forming device 20, for example, at lunchtime or late at night, the image forming device 20 changes its operation mode to the power saving mode, thereby performing control to save the power consumption. After that, at a predetermined timing, for example, after a predetermined period has elapsed, the image forming device 20 changes its operation mode to the normal mode. The operation modes of the image forming device 20 are stored in the memory 22.

FIG. 4 is a diagram illustrating an example of the reference address 221. As illustrated in FIG. 4, the reference address 221 stores, in association with each other, user IDs and IP addresses of the image forming devices 20 that may be referred to by using the user IDs.

Figure 5:
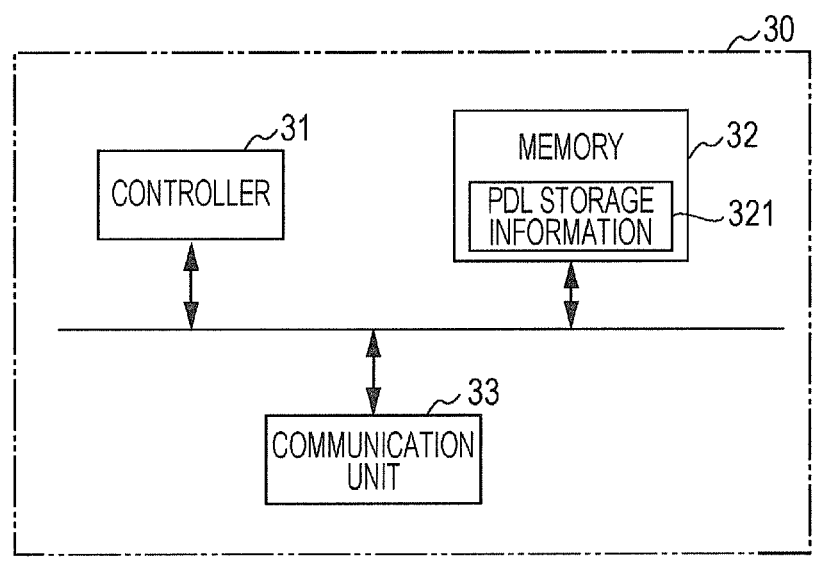
FIG. 5 is a block diagram illustrating the hardware configuration of an authentication server.

FIG. 5 is a block diagram illustrating the hardware configuration of the authentication server 30. The authentication server 30 includes a controller 31, a memory 32, and a communication unit 33. These units are electrically connected to one another via a bus. The controller 31 is configured as a computer including a CPU, a ROM, and a RAM. The CPU executes a control program stored in the ROM or the memory 32, thereby controlling the units connected to the controller 31. The communication unit 33 communicates with the image forming devices 20 under the control performed by the controller 31. The memory 32 is a storage device such as a hard disk, and stores the control program and PDL storage information 321, for example.

FIG. 6 is a diagram illustrating an example of the PDL storage information 321. The PDL storage information 321 is constituted by plural items including "PDL identifier", "user ID", "IP address", "PDL storage region", "data size", "number of outputs", "latest output time", and "remote output instruction from another device". "PDL identifier" is an identifier for uniquely identifying a piece of PDL storage information, and is composed of a four-digit number. "User ID" has been described above. "IP address" is an IP address assigned to the image forming device 20 including the memory 22 corresponding to the storage region of PDL data. "PDL storage region" indicates the storage region of PDL data, and is represented by a file pathname including a file name of image data in the PDL data. For example, as illustrated in FIG. 6, in the piece of PDL storage information having a user ID "User02" and an IP address "192. 168. 227. 102", the file name of image data in PDL data is "PDL-Z". "Data size" is the size of PDL data, and Kbyte (kilobyte) is used here as a unit. "Number of outputs" is the number of times output based on PDL data has been performed. Here, output based on PDL data means output of a sheet on which an image based on PDL data is formed. "Latest output time" is the latest time when output based on PDL data was performed in the entire image forming system 100. "Remote output instruction from another device" indicates, assuming that a certain image forming device 20 is the image forming device 20A, for example, the IP address of another image forming device 20 that has provided an instruction to output the PDL data stored in the image forming device 20A, and the number of times the PDL data stored in the image forming device 20A was output in response to the instruction from the other image forming device 20. In other words, providing a remote output instruction means that a certain image forming device 20 instructs another image forming device 20 to output the PDL data stored in the other image forming device 20.

Figure 7:
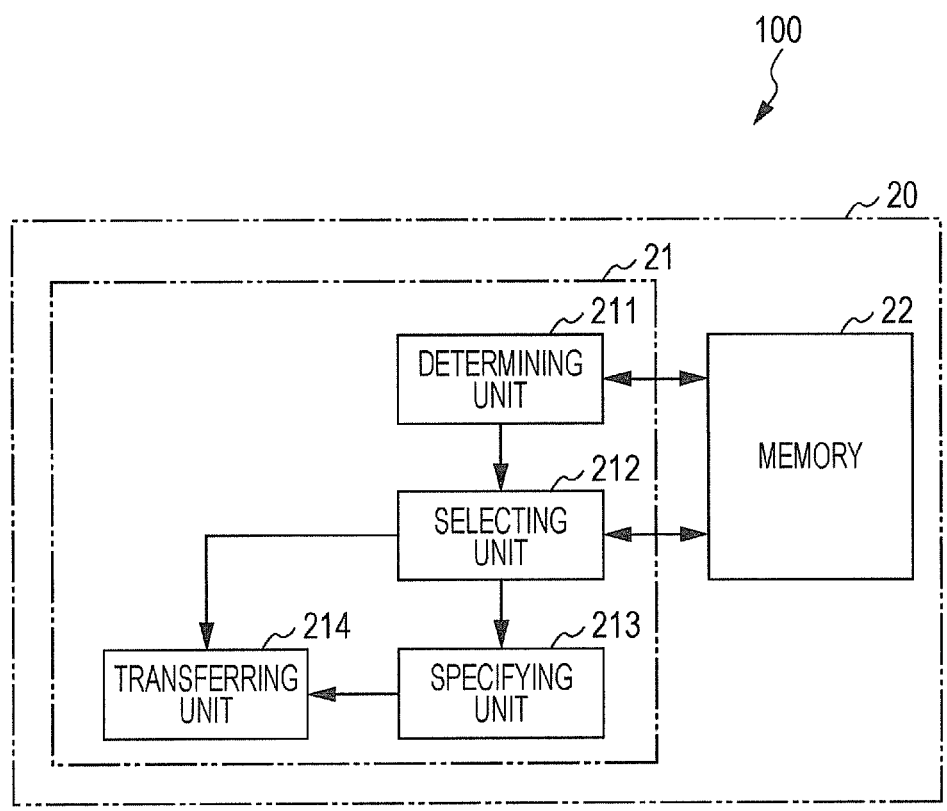
FIG. 7 is a block diagram illustrating the functional configuration of the image forming system.

FIG. 7 is a block diagram illustrating the functional configuration of the image forming system 100.

The image forming device 20 is an example of an image forming device that forms an image corresponding to image data. The memory 22 is an example of a memory that stores one or more pieces of image data. A determining unit 211, which is realized by the controller 21, is an example of a determining unit that determines whether or not usage of the memory 22 of the image forming device 20 is larger than a threshold. A selecting unit 212, which is realized by the controller 21, is an example of a selecting unit that selects, if the determining unit 211 determines that usage of the memory 22 is larger than the threshold, a piece of image data to be transferred from among the pieces of image data stored in the memory 22. A specifying unit 213, which is realized by the controller 21, is an example of a specifying unit that specifies a specific image forming device 20 to which the selected piece of image data is to be transferred. A transferring unit 214, which is realized by the controller 21, is an example of a transferring unit that transfers the piece of image data selected by the selecting unit 212 to the specific image forming device 20 specified by the specifying unit 213.

Figure 8:
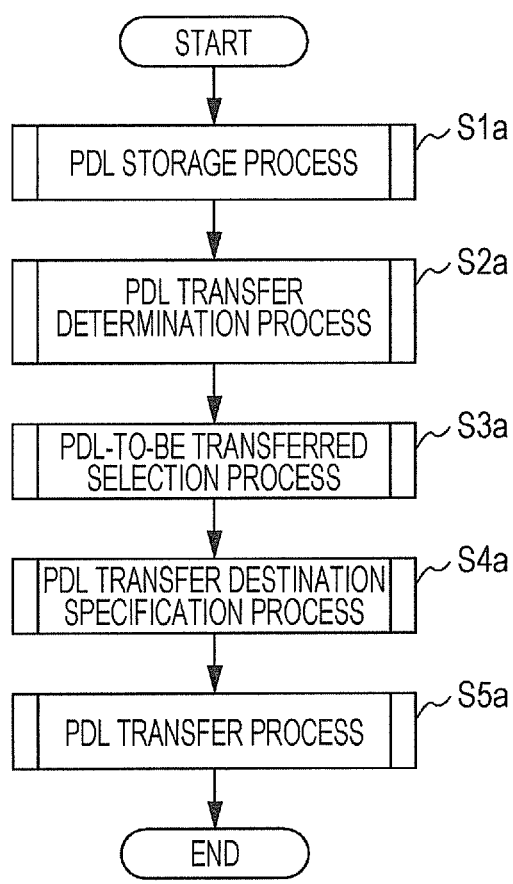
FIG. 8 is a flowchart illustrating operation of the image forming system.

FIG. 8 is a flowchart illustrating operation of the image forming system 100. In the description of the flowchart given below, a "user" is the user having a user ID "User01". When the user provides a print instruction by operating the communication terminal 10, PDL data is transmitted from the communication terminal 10 to the image forming device 20 set to the printer driver 121 of the communication terminal 10. The image forming device 20 receives the PDL data and stores the PDL data in the memory 22, that is, in a storage region. Then, the controller 21 of the image forming device 20 transmits information based on the stored PDL data to the authentication server 30 by using the communication unit 23. The information transmitted here includes the user ID "User01", the IP address of the image forming device 20, the storage region in the image forming device 20 in which the PDL data is stored, and the size of the PDL data. The controller 31 of the authentication server 30 receives the information by using the communication unit 33, generates PDL storage information based on the received information, and stores the generated information in the memory 32. At this time, the controller 31 assigns a new PDL identifier to the generated PDL storage information. The controller 31 transmits, by using the communication unit 33, the assigned PDL identifier to the image forming device 20 that has transmitted the information based on the PDL data. The controller 21 of the image forming device 20 receives the PDL identifier by using the communication unit 23, and stores the received PDL identifier in the memory 22 in association with the information based on the PDL data transmitted to the authentication server 30.

After that, it is assumed that the user moves to a site where there is the image forming device 20A to which the IP address "192. 168. 227. 101" has been assigned, and operates the image forming device 20A to provide an instruction to output an image. Before execution of the processing flow illustrated in FIG. 8 starts, the user has input the user ID and password in the image forming device 20A, the user ID and password have been transmitted from the image forming device 20A to the authentication server 30, the authentication server 30 has completed user authentication, and the controller 21A of the image forming device 20A has stored the user ID input at the time of authentication in the RAM. Hereinafter, the outline of a series of processes will be described with reference to the flowchart illustrated in FIG. 8, and then each process will be described in detail.

The controller 21A stores, in the memory 22A, a piece of PDL data which is transmitted from the communication terminal 10 in response to a print instruction provided by the user (PDL storage process: step S1a). Subsequently, the controller 21A checks a free space in the memory 22A, and determines whether or not there is a piece of PDL data that is to be transferred to another image forming device 20 in order to acquire a free space in the memory 22A, among pieces of PDL data stored in the memory 22A (PDL transfer determination process: step S2a). Subsequently, the controller 21A selects a piece of PDL data to be transferred (PDL-to-be-transferred selection process: step S3a). Subsequently, the controller 21A specifies another image forming device 20 to which the selected piece of PDL data is to be transferred (PDL transfer destination specification process: step S4a). Subsequently, the controller 21A transmits the selected piece of PDL data to the specified image forming device 20 by using the communication unit 23A (PDL transfer process: step S5a).

Figure 9:
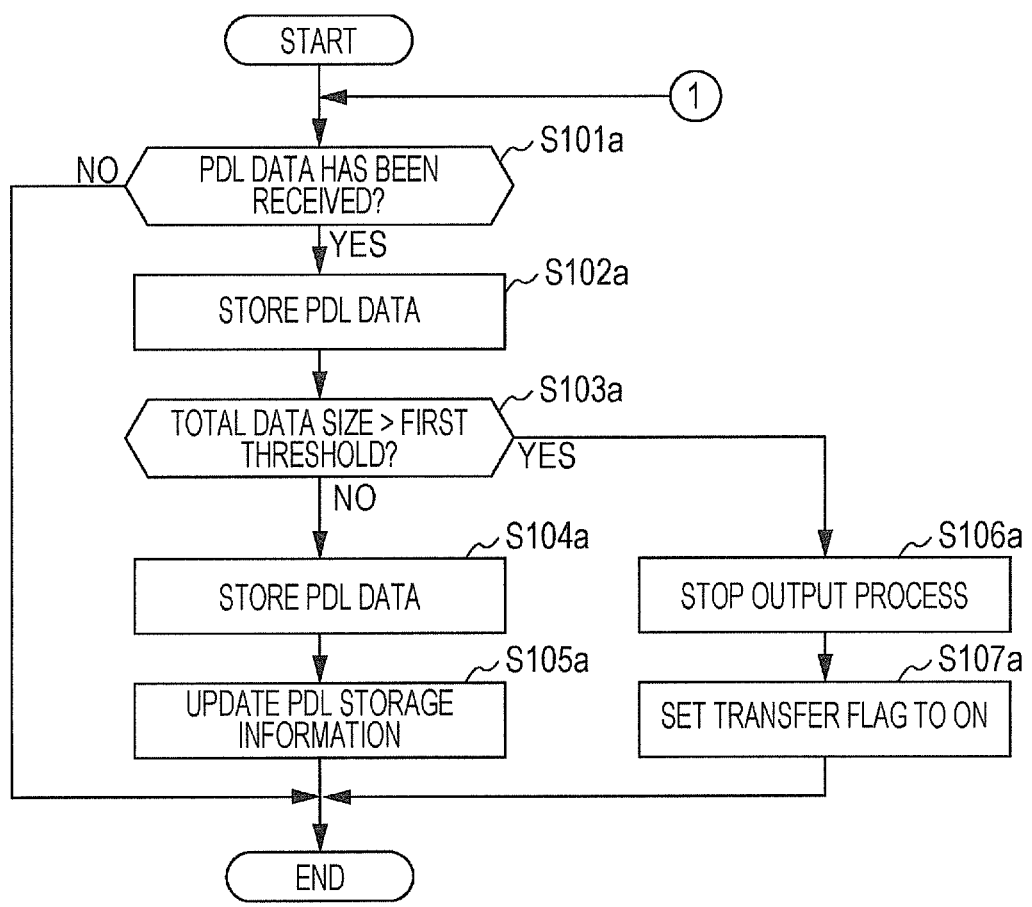
FIG. 9 is a flowchart illustrating a PDL storage process.

FIG. 9 is a flowchart illustrating the PDL storage process. If the communication unit 23A has received a piece of PDL data from the communication terminal 10 (YES in step S101a), the controller 21A stores the received piece of PDL data in the RAM (step S102a). It is assumed that the file name of image data included in the piece of PDL data is "PDL-D". On the other hand, if the communication unit 23A has not received a piece of PDL data (NO in step S101a), the process in FIG. 9 ends, and the process proceeds to the process in FIG. 10. After step S102a, assuming that the piece of PDL data stored in the RAM has been stored in the memory 22A, the controller 21A determines whether or not the total data size of various pieces of data in the memory 22A is larger than a first threshold (step S103a). The first threshold is predetermined as a threshold regarding a storage capacity, and is stored in the memory 22A.

If the total data size is not larger than the first threshold (NO in step S103a), the controller 21A stores the piece of PDL data (PDL-D), which is stored in the RAM in step S102a, in the storage region, that is, in the memory 22A (step S104a). Subsequently, the controller 21A transmits the piece of PDL data stored in the RAM to the authentication server 30 by using the communication unit 23A, and thereby the PDL storage information 321 is updated (step S105a). Specifically, in step S105a, the controller 31 of the authentication server 30 receives the piece of PDL data by using the communication unit 33, and updates the PDL storage information 321 on the basis of the received piece of PDL data.

On the other hand, if the total data size is larger than the first threshold (YES in step S103a), the controller 21A stops an output process based on the piece of PDL data stored in the RAM, sets an output stop flag, which indicates whether or not an output process has stopped, to ON, which indicates that the output process has stopped, and stores the flag in the RAM (step S106a). Subsequently, the controller 21A sets a transfer flag, which indicates whether or not a piece of PDL data is to be transferred, to ON, which indicates that a piece of PDL data is to be transferred, and stores the flag in the RAM (step S107a). Here, it is assumed that the total data size is larger than the first threshold (YES in step S103a), and steps S106a and S107a are performed.

Figure 10:
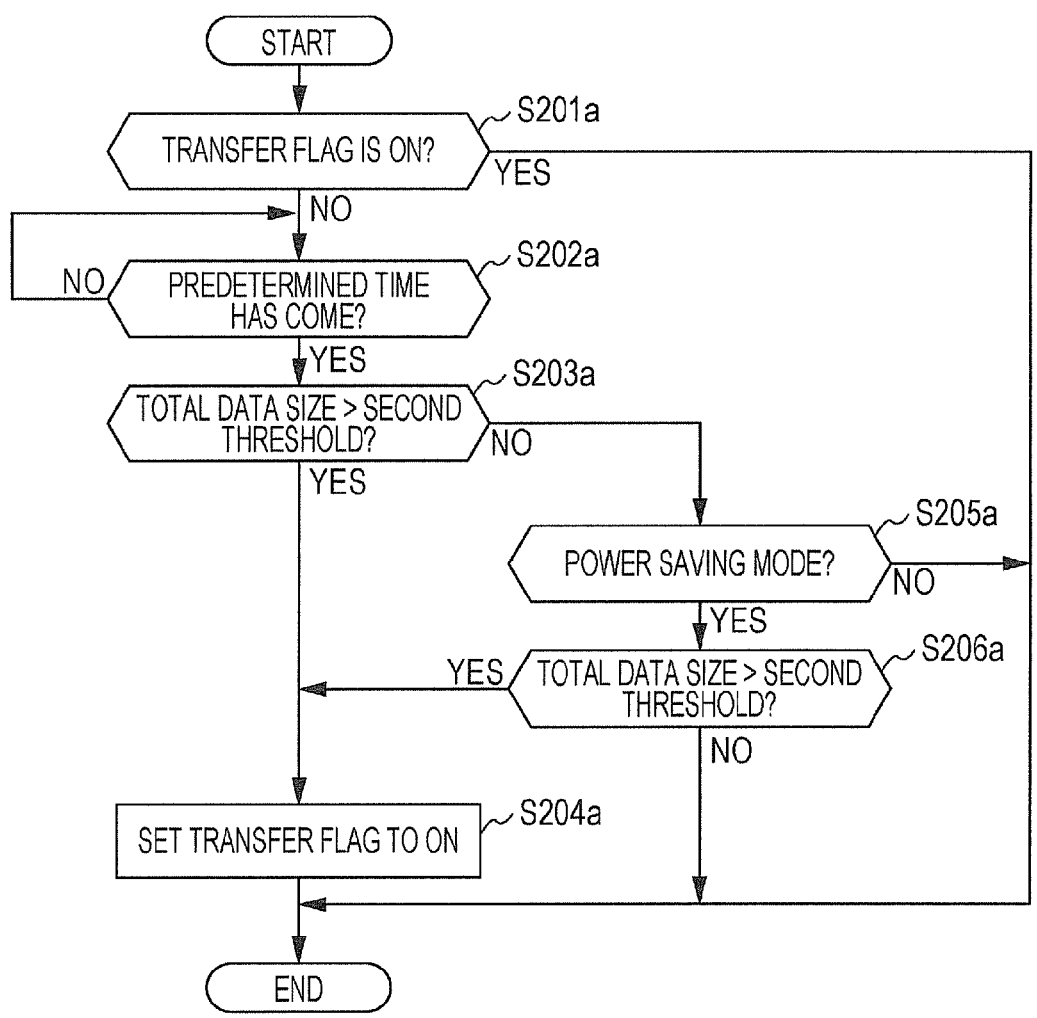
FIG. 10 is a flowchart illustrating a PDL transfer determination process.

FIG. 10 is a flowchart illustrating the PDL transfer determination process. The controller 21A determines whether or not the transfer flag stored in the RAM is set to ON (step S201a). If the transfer flag is set to ON (YES in step S201a), the controller 21A ends the process in FIG. 10 and proceeds to the process in FIG. 11. If the transfer flag is not set to ON (NO in step S201a), the controller 21A determines whether or not a predetermined time has come (step S202a). The predetermined time may be a predetermined interval, for example, every hour or every half an hour, or may be a time in a specific time period, such as lunchtime or late at night. The predetermined time and predetermined interval may be stored in the memory 22A, and may be changeable by the user using the UI unit 24A. If the predetermined time has not come (NO in step S202a), the controller 21A repeats the determination in step S202a until the predetermined time comes. If the predetermined time has come (YES in step S202a), the controller 21A determines whether or not the total data size of various pieces of data stored in the memory 22A is larger than a second threshold (step S203a). The second threshold is a threshold regarding a storage capacity, is smaller than the first threshold, and is stored in the memory 22A.

If the total data size of the various pieces of data stored in the memory 22A is larger than the second threshold (YES in step S203a), the controller 21A sets the transfer flag to ON and stores the flag in the RAM (step S204a). On the other hand, if the total data size is not larger than the second threshold (NO in step S203a), the controller 21A determines whether or not the operation mode of the image forming device 20A is the power saving mode on the basis of the content stored in the memory 22A (step S205a). If the operation mode is not the power saving mode (NO in step S205a), the controller 21A ends the process in FIG. 10 and proceeds to the process in FIG. 11. If the operation mode is the power saving mode (YES in step S205a), the controller 21A determines whether or not the total data size of the various pieces of data stored in the memory 22A is larger than the second threshold (step S206a). If the total data size is not larger than the second threshold (NO in step S206a), the controller 21A ends the process in FIG. 10 and proceeds to the process in FIG. 11. If the total data size is larger than the second threshold (YES in step S206a), the controller 21A sets the transfer flag to ON and stores the flag in the RAM (step S204a).

Figure 11:
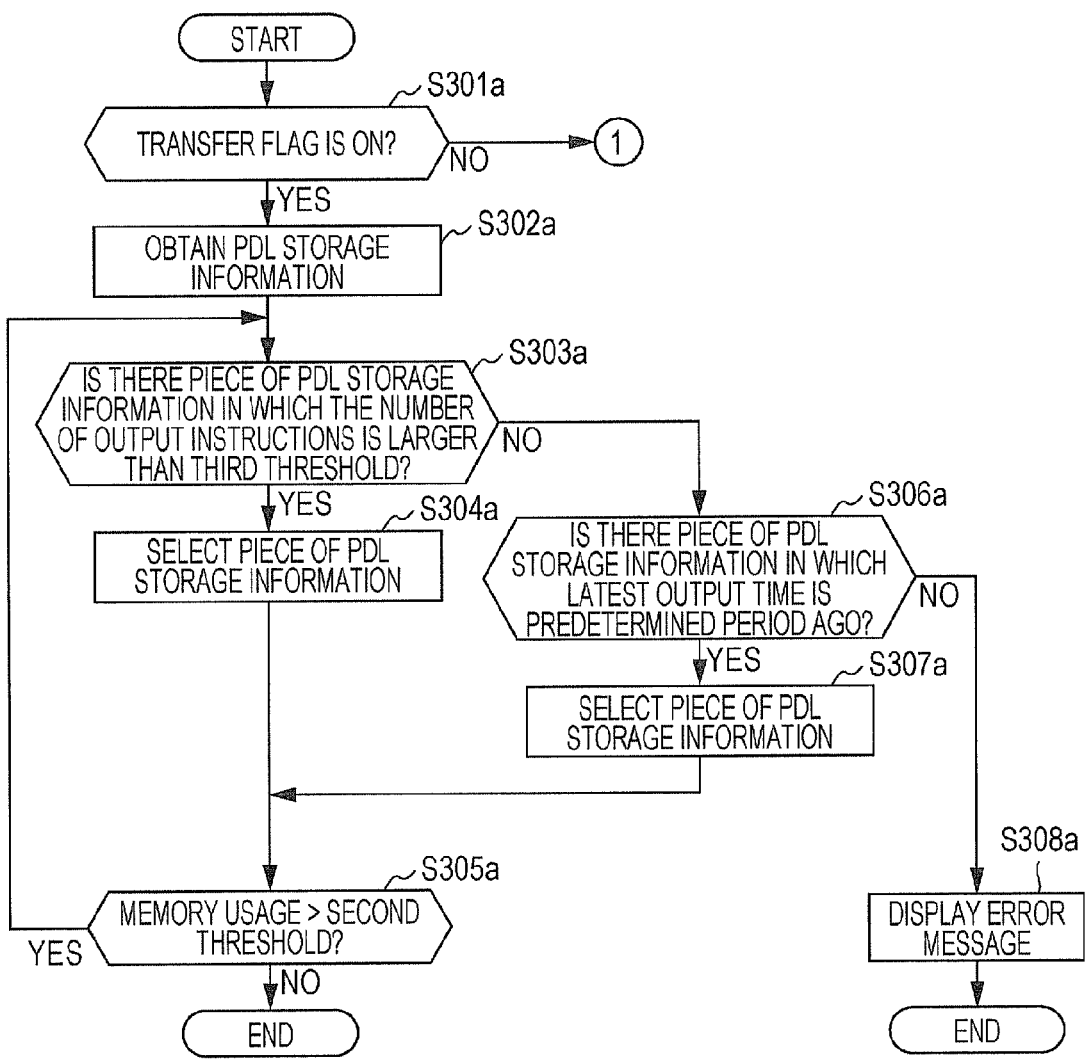
FIG. 11 is a flowchart illustrating a PDL-to-be-transferred selection process.

FIG. 11 is a flowchart illustrating the PDL-to-be-transferred selection process. The controller 21A determines whether or not the transfer flag stored in the RAM is ON (step S301a). If the transfer flag is OFF (NO in step S301a), the controller 21A ends the process in FIG. 11 and returns to the process in FIG. 9. On the other hand, if the transfer flag is ON (YES in step S301a), the controller 21A obtains pieces of PDL storage information in the PDL storage information 321 from the authentication server 30 by using the communication unit 23A, and stores them in the RAM (step S302a). Specifically, in step S302a, the controller 21A instructs the authentication server 30 to search the PDL storage information 321 by using the user ID stored in the RAM (in this case User01) as a key. In response to the instruction, the controller 31 of the authentication server 30 searches for pieces of PDL storage information including the user ID "User01", and transmits the search result to the image forming device 20A by using the communication unit 33.

Subsequently, the controller 21A determines whether or not the pieces of PDL storage information stored in the RAM include a piece of PDL storage information in which the number of remote output instructions from another device is larger than a predetermined third threshold (step S303a). The third threshold is a value set for the number of remote output instructions, and is "5", for example. If the pieces of PDL storage information stored in the RAM include a piece of PDL storage information in which the number of remote output instructions from another device is larger than the third threshold (YES in step S303a), the controller 21A selects the piece of PDL storage information and stores it in the RAM (step S304a). Here, as illustrated in FIG. 6, the piece of PDL storage information including a PDL identifier "0001" and including a file name "PDL-A" in the PDL storage region is selected and stored in the RAM by the controller 21A.

Subsequently, the controller 21A determines whether or not the usage of the memory 22A is larger than the second threshold (step S305a). Specifically, in step S305a, the controller 21A subtracts, from the total data size of the various pieces of data stored in the memory 22A, the size of the PDL data indicated by the piece of PDL storage information that has been selected and stored in the RAM, and determines whether or not the value obtained through the subtraction is larger than the second threshold. If the usage of the memory 22A is not larger than the second threshold (NO in step S305a), the controller 21A ends the process in FIG. 11 and proceeds to the process in FIG. 12. On the other hand, if the usage of the memory 22A is larger than the second threshold (YES in step S305a), the controller 21A returns to step S303a. Here, it is assumed that the total data size of the various pieces of data stored in the memory 22A is 5120 Kbytes and that the second threshold is 4096 Kbytes. The size of the PDL data "PDL-A" selected to be transferred is 512 Kbytes, as illustrated in FIG. 6. Thus, 4608 Kbytes, which is the value obtained by subtracting the size of the PDL data from the total data size, is larger than the second threshold. Accordingly, the controller 21A determines that the usage of the memory 22A is larger than the second threshold (YES in step S305a), and returns to step S303a.

In step S303a, the controller 21A performs determination again by excluding the piece of PDL storage information selected in steps S303a and S304a performed previously. Here, as illustrated in FIG. 6, the pieces of PDL storage information stored in the RAM include no more piece of PDL storage information in which the number of remote output instructions from another device is larger than the third threshold "5" (NO in step S303a). Thus, the controller 21A proceeds to step S306a. The controller 21A determines whether or not the pieces of PDL storage information stored in the RAM include a piece of PDL storage information in which the latest output time is a predetermined time period ago or more (step S306a). Here, the predetermined time period is "three days", for example. In step S306a, the controller 21A compares the latest output times included in the pieces PDL storage information stored in the RAM with the current time obtained from a timer, and determines whether or not there is a piece of PDL storage information including a latest output time which is three days (72 hours) ago or more. If such a piece of PDL storage information exists (YES in step S306a), the controller 21A selects the piece of PDL storage information and stores it in the RAM (step S307a). Here, as illustrated in FIG. 6, the piece of PDL storage information including a PDL identifier "0002" and including a file name "PDL-B" in the PDL storage region is selected and stored in the RAM by the controller 21A. If such a piece of PDL storage information does not exist (NO in step S306a), the controller 21A determines that there is no PDL data to be transferred to acquire a free space of the memory 22A, causes the UI unit 24 to display an error message "there is no PDL data to be transferred, and free space cannot be acquired", for example (step S308a), and ends the processes in FIGS. 11 and 8.

As describes above, the determination in step S303a is performed before the determination in step S306a. The reason is as follows. The PDL data included in a piece of PDL storage information in which the number of remote output instructions from another device is larger than the third threshold is more likely to be output from another image forming device 20 than the image forming device 20A. In other words, such PDL data is less likely to be output from the image forming device 20A. The reason is as follows. As described above, providing a remote output instruction from another device means that a certain image forming device 20 instructs another image forming device 20 to output PDL data stored in the other image forming device 20. That is, as the number of remote output instructions from another image forming device 20 increases, the PDL data has more opportunities of being output from the other image forming device 20, that is, the PDL data has less opportunities of being output from the image forming device 20A. Thus, the PDL data included in a piece of PDL storage information in which the number of remote output instructions from another device is larger than the third threshold is more likely to be output from another image forming device 20 than the image forming device 20A. In other words, such PDL data is less likely to be output from the image forming device 20A.

Also, the PDL data included in a piece of PDL storage information in which the latest output time is a predetermined time period ago or more has not been output from the image forming device 20A for a certain period or more since the PDL data was stored in the image forming device 20A. That is, such PDL data has been output at least once, and is thus less likely to be instructed to be output by the user, compared to the PDL data that has been stored recently in the image forming device 20A. As described above, PDL data included in a piece of PDL storage information in which the number of remote output instructions from another device is larger than the third threshold, and PDL data included in a piece of PDL storage information in which the latest output time is a predetermined time period ago or more are less likely to be output from the image forming device 20A, compared to the other PDL data. In contrast, PDL data included in a piece of PDL storage information in which the number of remote output instructions from another device is larger than the third threshold is less likely to be output from the image forming device 20A, and is also more convenient when being stored in another image forming device 20 that has been provided with a remote output instruction, because the time and effort to transmit and receive the PDL data between image forming devices 20 may be saved. For the above-described reason, the determination in step S303a is performed before the determination in step S306a.

After step S307a, the controller 21A performs determination in step S305a. Then, the controller 21A continues the process in accordance with the flowchart in FIG. 11 until it is determined that the usage of the memory 22A is not larger than the second threshold (NO in step S305a) and the process proceeds to the process illustrated in FIG. 12, or until an error message is displayed on the UI unit 24 (step S308a) and the processes in FIGS. 11 and 8 end. Here, it is assumed that pieces of PDL storage information including "PDL-A" and "PDL-B" as a file name in "PDL storage region" in FIG. 6 are selected as pieces of PDL storage information indicating the pieces of PDL data to be transferred and are stored in the RAM by the controller 21A. As illustrated in FIG. 6, the size of the PDL data corresponding to "PDL-A" selected to be transferred is 512 Kbytes, and the size of the PDL data corresponding to "PDL-B" selected to be transferred is 1024 Kbytes. The value of 3584 Kbytes, which is obtained by subtracting the sizes of the piece of PDL data to be transferred from the total data size 5120 Kbytes of the various piece of data stored in the memory 22A, is not larger than the second threshold. Thus, the controller 21A determines that the usage of the memory 22A is not larger than the second threshold (NO in step S305a), ends the process in FIG. 11, and proceeds to the process in FIG. 12.

Figure 12:
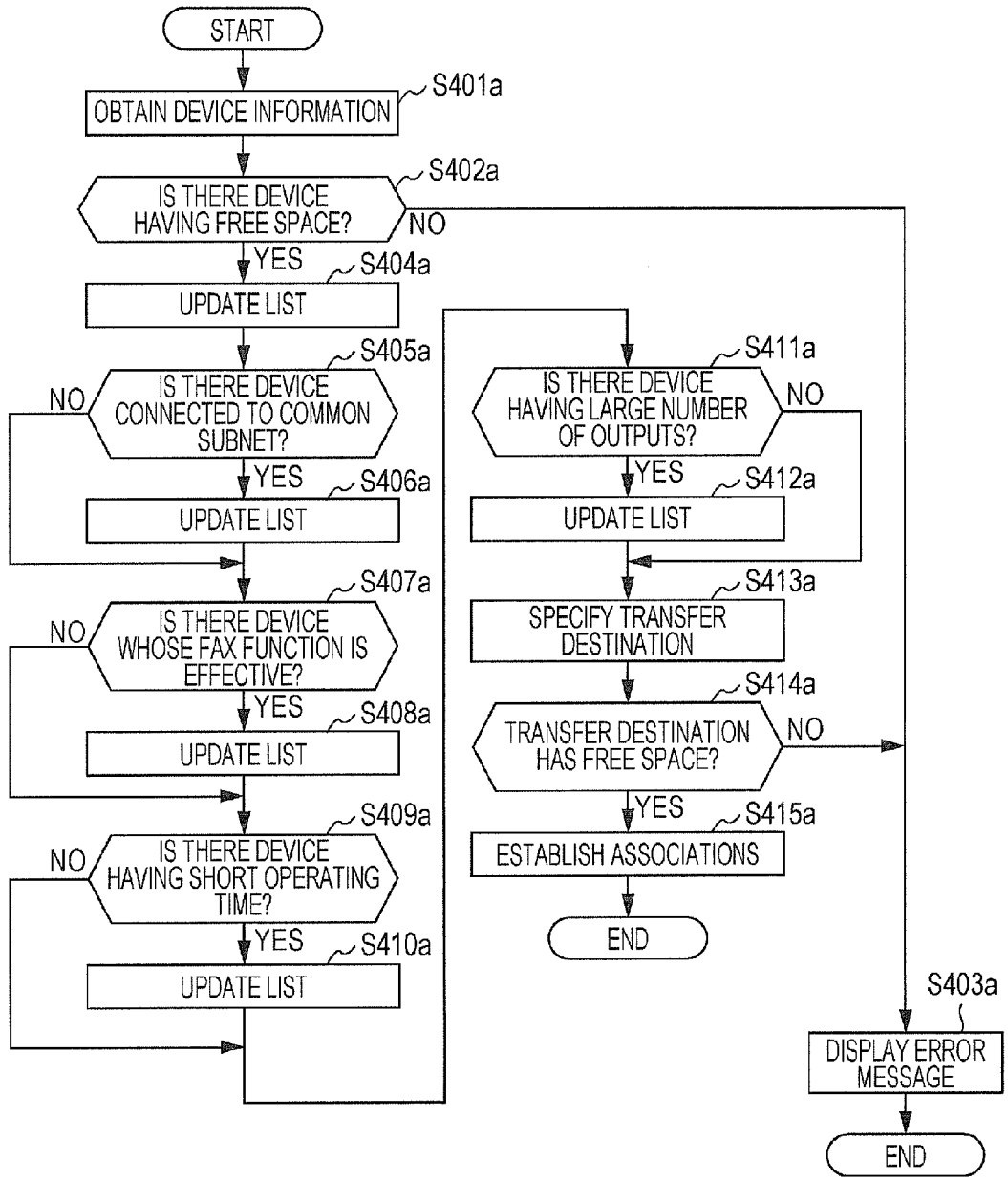
FIG. 12 is a flowchart illustrating a PDL transfer destination specification process.

FIG. 12 is a flowchart illustrating the PDL transfer destination specification process. First, the controller 21A obtains device information from another image forming device 20, and writes the device information into a transfer destination list, which indicates the image forming device 20 to which PDL data is to be transferred, so as to store the device information in the RAM (step S401a). In step S401a, the controller 21A obtains device information from the image forming device 20 to which an IP address described in the reference address 221 stored in the memory 22A is assigned. The controller 21A transmits, by using the communication unit 23A, a request for device information to the reference IP addresses associated with the user ID "User01" in FIG. 4. The controllers 21 of the individual image forming devices 20 that have received the request transmit, by using the individual communication units 23, the device information to the image forming device 20A. The controller 21A writes the device information received by using the communication unit 23A into the transfer destination list, so as to store the device information in the RAM.

FIG. 13 is a diagram illustrating an example of device information 400. The device information 400 is constituted by plural items including "IP address", "usage", "fax function", "operating time", and "number of outputs". "IP address" is an IP address assigned to each image forming device 20. "Usage" is usage of the memory 22 of each image forming device 20, and the unit is Kbyte. "Fax function" indicates whether the fax function is effective or ineffective in each image forming device 20. "Operating time" indicates the time period in which each image forming device 20 has been operating since power on. "Number of outputs" indicates the number of times output based on PDL data has been performed in each image forming device 20. Examples of the number of outputs include the number of times output based on PDL data has been performed since the installation of a certain image forming device 20, and the number of times output based on PDL data has been performed from power on to power off of a certain image forming device 20. In addition, the controller 21 of each image forming device 20 may reset the number of outputs at predetermined timings, for example, every day or every month.

Referring back to FIG. 12, after step S401a, if the transfer destination list includes a piece of device information regarding the image forming device 20 in which usage of the memory 22 is not larger than the second threshold (YES in step S402a), the controller 21A keeps the piece of device information in the transfer destination list and deletes the other pieces of device information, thereby updating the transfer destination list stored in the RAM (step S404a). The determination in step S402a is performed in the following manner. As described above, in FIG. 6, two pieces of PDL storage information including "PDL-A" and "PDL-B" as file names in "PDL storage region" are stored in the RAM as pieces of PDL storage information indicating pieces of PDL data to be transferred. As illustrated in FIG. 6, the data size corresponding to "PDL-A" is 512 Kbytes, and the data size corresponding to "PDL-B" is 1024 Kbytes. In step S402a, the controller 21A determines whether or not there is a piece of device information regarding the image forming device 20 in which the sum of the usage of the memory 22 and the size of the smallest piece of PDL data to be transferred is equal to or smaller than the second threshold. That is, the controller 21A keeps a piece of device information in which the sum of the usage and 512 Kbytes is equal to or smaller than 4096 Kbytes, which is the second threshold, and deletes the other pieces of device information. As a result, in step S404a, the controller 21A updates the transfer destination list stored in the RAM, so that the piece of device information indicating the usage is 3840 Kbytes is deleted and the other pieces of device information are kept, as illustrated in FIG. 13. On the other hand, if the device information 400 does not include a piece of device information regarding the image forming device 20 in which the sum of the usage of the memory 22 and the size of the smallest piece of PDL data to be transferred is equal to or smaller than the second threshold (NO in step S402a), the controller 21A causes the UI unit 24 to display an error message "there is no image forming device having sufficient free space" (step S403a), and ends the processes in FIGS. 12 and 8.

After step S404a, if the pieces of device information described in the transfer destination list include a piece of device information regarding the image forming device 20 connected to a subnet shared by the image forming device 20A (YES in step S405a), the controller 21A keeps the piece of device information and deletes the other pieces of device information, thereby updating the transfer destination list stored in the RAM (step S406a). A subnet is a small network, which is a unit of management used in the case of managing a network by dividing it into plural smaller networks. The determination in step S405a is performed in the following manner. For example, in a case where a subnet mask set to the image forming device 20A is "255. 255. 255. 0", the IP address assigned to the image forming device 20A is "192. 168. 227. 101", and thus the network address is "192. 168. 227". Thus, in step S405a, the controller 21A specifies a piece of device information including an IP address starting with "192. 168. 227" as the piece of device information regarding the image forming device 20 connected to the common subnet. As a result, in step S406a, the controller 21A deletes the piece of device information in which the IP address does not start with "192. 168. 227" and keeps the other pieces of device information, as illustrated in FIG. 13, thereby updating the transfer destination list stored in the RAM. On the other hand, if the pieces of device information described in the transfer destination list do not include a piece of device information regarding the image forming device 20 connected to the subnet shared by the image forming device 20A (NO in step S405a), the controller 21A proceeds to step S407a.

After step S405a or S406a, if the pieces of device information described in the transfer destination list include a piece of device information indicating that a fax function is effective (YES in step S407a), the controller 21A keeps the piece of device information and deletes the other pieces of device information, thereby updating the transfer destination list stored in the RAM (step S408a). As a result, in step S408a, the controller 21A updates the transfer destination list stored in the RAM so that the piece of device information in which the fax function is ineffective is deleted and the other pieces of device information are kept, as illustrated in FIG. 13. On the other hand, if the pieces of device information described in the transfer destination list do not include a piece of device information indicating that a fax function is effective (NO in step S407a), the controller 21A proceeds to step S409a. The image forming devices 20 whose fax function is effective are regarded as candidate transfer destinations for the following reason: it is desired to be constantly capable of receiving a document transmitted by fax, and thus the image forming device 20 whose fax function is effective is regarded as being kept in an energized state for a long time and being less likely to be powered off.

After step S407a or S408a, if the pieces of device information described in the transfer destination list include a piece of device information indicating that an operating time is shorter than a predetermined period (YES in step S409a), the controller 21A keeps the piece of device information and deletes the other pieces of device information, thereby updating the transfer destination list stored in the RAM (step S410a). Here, the predetermined period is three hours, for example, which is stored in the memory 22A. As a result, in step S409a, the controller 21A deletes the piece of device information in which the operating time is three hours or more, and keeps the other pieces of device information, thereby updating the transfer destination list stored in the RAM, as illustrated in FIG. 13. On the other hand, if the pieces of device information described in the transfer destination list do not include a piece of device information in which the operating time is shorter than the predetermined period (NO in step S409a), the controller 21A proceeds to step S411a.

After step S409a or S410a, if the pieces of device information described in the transfer destination list include a piece of device information indicating that the number of outputs is larger than a predetermined number (YES in step S411a), the controller 21A keeps the piece of device information and deletes the other pieces of device information, thereby updating the transfer destination list stored in the RAM (step S412a). Here, the predetermined number is "15", for example, which is stored in the memory 22A. As a result, in step S412a, the controller 21A updates the transfer destination list stored in the RAM by deleting the pieces of device information in which the number of outputs is smaller than "15" and keeping the other piece of device information, as illustrated in FIG. 13. On the other hand, if the pieces of device information described in the transfer destination list do not include a piece of device information in which the number of outputs is larger than the predetermined number (NO in step S411a), the controller 21A proceeds to step S413a.

After step S411a or S412a, the controller 21A specifies a piece of device information indicating the image forming device 20 to which PDL data is to be transferred, among the pieces of device information described in the transfer destination list stored in the RAM (step S413a). In step S413a, in a case where plural pieces of device information are described in the transfer destination list stored in the RAM, the controller 21A specifies all the pieces of device information. Here, the controller 21A specifies the piece of device information including the IP address "192. 168. 227. 104" illustrated in FIG. 13, among the pieces of device information described in the transfer destination list stored in the RAM.

Subsequently, the controller 21A determines whether or not the image forming device 20 indicated by the piece of device information specified as the transfer destination of the PDL data has a sufficient free space (step S414a). Specifically, in step S414a, the controller 21A determines whether or not the total size of the PDL data to be transferred is larger than a total value obtained by subtracting, from the second threshold, the usage indicated by the piece of device information specified as a transfer destination of the PDL data. If the image forming device 20 indicated by the piece of device information specified as the transfer destination of the PDL data does not have a sufficient free space (NO in step S414a), the controller 21A causes the UI unit 24 to display an error message "there is no image forming device having a sufficient free space" (step S403a), and ends the process. On the other hand, if the image forming device 20 indicated by the piece of device information specified as the transfer destination of the PDL has a sufficient free space (YES in step S414a), the controller 21A stores, in the RAM, the piece of device information specified as a transfer destination and the information indicating the PDL data to be transferred in association with each other in the transfer destination list (step S415a). Here, the value obtained by subtracting 1024 Kbytes, which is the usage indicated by the piece of device information including the IP address "192. 168. 227. 104", from 4096 Kbytes, which is the second threshold, is 3072 Kbytes. The total size of the PDL data to be transferred is 1536 Kbytes. Thus, the controller 21A determines that the image forming device 20 indicated by the piece of device information specified as the transfer destination of the PDL data has a sufficient free space.

In step S415a, the controller 21A stores, in the RAM, specified pieces of device information in descending order of the value obtained by subtracting the usage from the second threshold, in association with the pieces of information indicating the pieces of PDL data to be transferred in descending order of the data size, in the transfer destination list. Here, the controller 21A stores, in the RAM, the specified piece of device information including the IP address "192. 168. 227. 104" and the PDL identifier of the PDL data to be transferred in association with each other in the transfer destination list.

Figure 14:
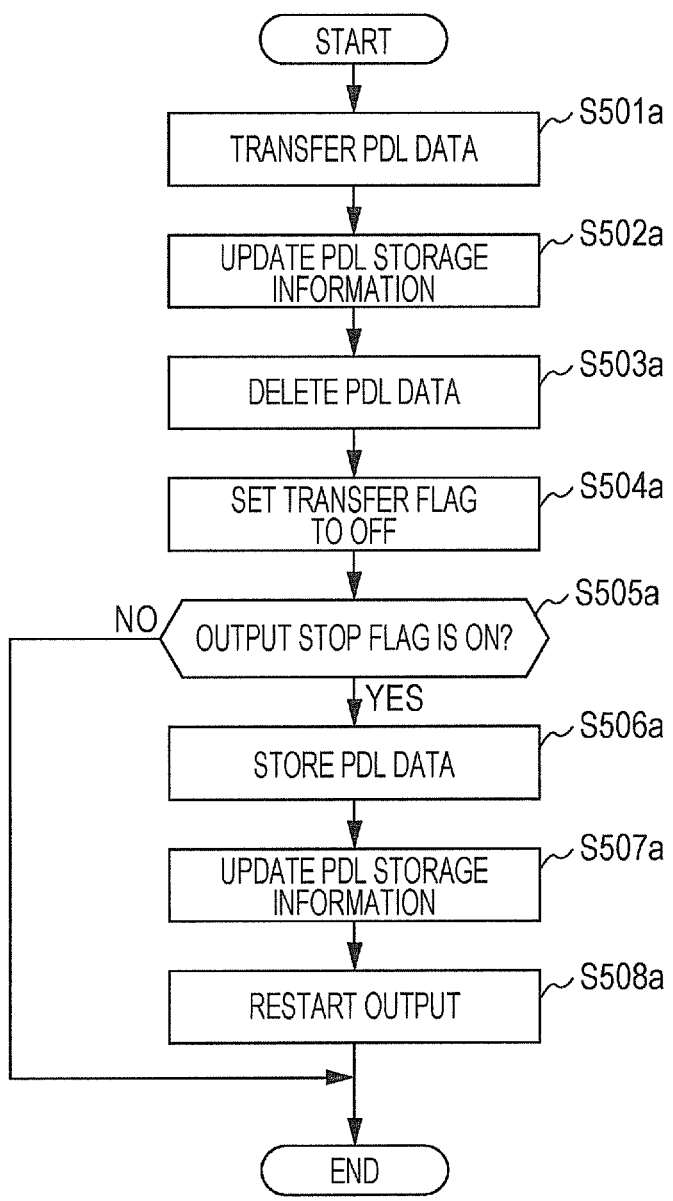
FIG. 14 is a flowchart illustrating a PDL transfer process.

FIG. 14 is a flowchart illustrating the PDL transfer process. The controller 21A transmits, by using the communication unit 23A, the PDL data to be transferred and the PDL identifier associated therewith to the image forming device 20 specified as a transfer destination, in accordance with the content described in the transfer destination list (step S501a). For example, the controller 21A transmits, by using the communication unit 23A, pieces of PDL data having files names "PDL-A" and "PDL-B" and the PDL identifiers associated with the respective pieces of PDL data to the image forming device 20 to which the IP address "192. 168. 227. 104" is assigned. Subsequently, the controller 21A instructs, by using the communication unit 23A, the authentication server 30 to update the PDL storage information 321, and also transmits the transfer destination list stored in the RAM to the authentication server 30 (step S502a). Here, the controller 31 of the authentication server 30 updates the IP address in the piece of PDL storage information in which the PDL identifier is "0001" or "0002", that is, the piece of PDL storage information in which the PDL storage region includes "PDL-A" or "PDL-B", to "192. 168. 227. 104" in the PDL storage information 321. Subsequently, the controller 21A deletes the pieces of PDL data that have been transferred to another image forming device 20 (here, "PDL-A" and "PDL-B") among the pieces of PDL data stored in the memory 22A (step S503a). Subsequently, the controller 21A sets the transfer flag stored in the RAM to OFF (step S504a).

Subsequently, if the output stop flag is OFF (NO in step S505a), the controller 21A ends the processes in FIGS. 14 and 8. On the other hand, if the output stop flag is ON (YES in step S505a), the controller 21A stores the PDL data (PDL-D) stored in the RAM in step S102a in the storage region, that is, in the memory 22A (step S506a). Subsequently, the controller 21A transmits the PDL data stored in the RAM to the authentication server 30 by using the communication unit 23A, and thereby updating the PDL storage information 321 (step S507a). Specifically, in step S507a, upon receiving the PDL data by using the communication unit 33, the controller 31 of the authentication server 30 updates the PDL storage information 321 on the basis of the received PDL data. Subsequently, the controller 21A sets the output stop flag to OFF, and restarts output based on the PDL data stored in the storage region in step S506a (step S508a).

FIG. 15 is a diagram illustrating the PDL storage information 321 after PDL data has been transferred. As illustrated in FIG. 15, in the pieces of PDL storage information in which the PDL identifier is "0001" or "0002" and the PDL storage region include "PDL-A" or "PDL-B", the IP address assigned to the image forming device 20 as a storage region of PDL data is "192. 168. 227. 104", which indicates the image forming device 20 to which the PDL data has been transferred. Also, a piece of PDL storage information in which the IP address is "192. 168. 227. 101" (image forming device 20A) and the PDL storage region includes "PDL-D" is newly added.

In a case where the user having the user ID "User01" provides a print instruction by using the image forming device 20A, the process is performed in the following manner. The controller 21A of the image forming device 20A transmits, by using the communication unit 23A, an instruction to search the PDL storage information 321 by using the authenticated user ID stored in the RAM as a key to the authentication server 30. The controller 31 of the authentication server 30 searches the PDL storage information 321 by using the user ID included in the instruction as a key. Here, if the PDL storage information 321 has the content illustrated in FIG. 15, the controller 31 of the authentication server 30 obtains pieces of PDL storage information in which the PDL storage region includes a file name "PDL-A", "PDL-B", "PDL-C", or "PDL-D" as a search result, and stores the search result in the RAM. Subsequently, the controller 31 of the authentication server 30 transmits the pieces of PDL storage information stored in the RAM to the image forming device 20A by using the communication unit 33. The controller 21A of the image forming device 20A receives the pieces of PDL storage information by using the communication unit 23A, and stores them in the RAM.

Subsequently, the controller 21A causes the UI unit 24A to display a list of the pieces of PDL storage information stored in the RAM. At this time, each record in the list includes a file name of the corresponding piece of PDL data, and the name or IP address for identifying the image forming device 20 in which the corresponding piece of PDL data is stored. When the user selects a specific record from the displayed list and provides a print instruction, the controller 21A transmits, to the image forming device 20 having the IP address included in the PDL storage information corresponding to the selected record by using the communication unit 23A, an instruction to transfer the piece of PDL data to the image forming device 20A. The controller 21 of the image forming device 20 that has received the instruction by using the communication unit 23 transmits the specified piece of PDL data to the image forming device 20A. The controller 21A performs output based on the piece of PDL data received by using the communication unit 23A. The controller 21 of the image forming device 20 that has transferred the piece of PDL data performs a process similar to the above-described steps S502a and S503a. Accordingly, the PDL storage information 321 is updated to the latest state in the authentication server 30, and the transferred piece of PDL data is deleted from the memory 22 of the image forming device 20.

According to the exemplary embodiment, when the usage of the memory 22 is larger than the first or second threshold at a predetermined timing, the controller 21 performs control of transferring a piece of PDL data stored in the image forming device 20 to another image forming device 20 by using the communication unit 23.

The predetermined timing may be any of a predetermined time and a time when the image forming device 20 is operating in the power saving mode, when the memory 22 of the image forming device 20 newly stores PDL data. Accordingly, whether or not the usage of the memory 22 is larger than the threshold is determined regularly or at various timings, for example, at the start of operation of the image forming device 20, during the operation, or during suspension of the operation. If the usage is larger than the threshold, a piece of PDL data is transferred.

Also, according to the exemplary embodiment, before specifying another image forming device 20 as a transfer destination of PDL data, the controller 21 specifies candidate image forming devices 20 whose memory 22 has a sufficient free space for storing the PDL data, and narrows down the candidates by determining whether or not each of the candidate image forming devices 20 is connected to a common subnet, and whether or not each of the candidate image forming devices 20 has an effective fax function.

Modifications

The above-described exemplary embodiment may be modified as described below. The following modifications may be carried out in an appropriate combination.

First Modification

The image forming system 100 may not include the authentication server 30, and the PDL storage information 321 may be stored in the memory 22 of each image forming device 20. In this case, the controller 21 of the image forming device 20 updates the PDL storage information 321 stored in the memory 22 in steps S105a, S502a, and S507a. Also, the controller 21 of the image forming device 20 obtains the PDL storage information 321 stored in the memory 22 of the image forming device 20 in step S302a.

In a case where the PDL storage information 321 is stored in the plural image forming devices 20, the identity of the PDL storage information 321 may be lost in the entire image forming system 100. This issue may be addressed in the following manner. For example, the controller 21 of the image forming device 20 in which the PDL storage information 321 has been updated transmits the PDL storage information 321 stored in the image forming device 20 to the other image forming devices 20 by using the communication unit 23 at a predetermined timing. The controller 21 of each of the image forming devices 20 that has received the PDL storage information 321 by using the communication unit 23 updates the PDL storage information 321 stored in the own memory 22 in accordance with the received PDL storage information 321. The predetermined timing may be time intervals, such as every half an hour or every hour, or may be a specific time period, such as lunchtime or late at night.

Second Modification

In the determination in step S409a, it may be determined whether or not a predetermined number or less of pieces of device information may be obtained in ascending order of the operating time from the pieces of device information described in the transfer destination list stored in the RAM, instead of whether or not the operating time is shorter than a predetermined period. In this case, in step S410a, the controller 21A keeps the predetermined number or less of pieces of device information in ascending order of the operating time among the pieces of device information described in the transfer destination list stored in the RAM, and deletes the other pieces of device information, thereby updating the transfer destination list. Also, in the determination in step S411a, it may be determined whether or not a predetermined number or less of pieces of device information may be obtained in descending order of the number of outputs from the pieces of device information described in the transfer destination list stored in the RAM, instead of whether or not the number of outputs is larger than a predetermined number.

In this case, in step S412a, the controller 21A keeps the predetermined number or less of pieces of device information in descending order of the number of outputs among the pieces of device information described in the transfer destination list stored in the RAM, and deletes the other pieces of device information, thereby updating the transfer destination list.

Third Modification

In the exemplary embodiment, the PDL storage information 321 is updated after the image forming device 20 has transferred PDL data. Alternatively, the following method may be used. In a third modification, an IP address included in the PDL storage information 321 is an IP address of a storage region when the PDL data is stored therein for the first time. In the third modification, the IP address is described as an initial value. Even if the storage region for the PDL data is changed thereafter, the controller 21 of the image forming device 20 does not provide an instruction to perform update. Also, in the third modification, the controller 21A of the image forming device 20 that has transferred PDL data (here, the image forming device 20A) stores, in the memory 22A, a set of a user ID included in the PDL data to be transferred, a PDL identifier associated with the PDL data to be transferred, and information for identifying the image forming device 20 as a transfer destination (here, IP address) in association with one another. Here, the foregoing set is referred to as transfer information.

First, assume a case where the user having the user ID "User01" operates the image forming device 20A to provide a print instruction. The user selects a record corresponding to a specific piece of PDL data from the list displayed on the UI unit 24A, and provides a print instruction. If the specific piece of PDL data is not stored in the memory 22A, the controller 21A obtains the specific piece of PDL data on the basis of the transfer information stored in the memory 22A and the PDL storage information 321 stored in the memory 32 of the authentication server 30. Specifically, if the transfer information stored in the memory 22A includes an IP address associated with the user ID "User01" and the PDL identifier of the piece of PDL data selected by the user, the controller 21A obtains the IP address and stores it in the RAM.

Also, the controller 21A transmits, to the authentication server 30 by using the communication unit 23A, an instruction to search the PDL storage information 321 by using the user ID "User01" and the PDL identifier associated with the piece of PDL data selected by the user as a key. The controller 31 of the authentication server 30 performs search in response to the instruction, and transmits a search result, that is, PDL storage information, to the image forming device 20A. Then, the controller 21A obtains the IP address from the received PDL storage information and stores it in the RAM.

The controller 21A transmits, to the image forming device 20 to which the IP address stored in the RAM is assigned as described above (the image forming device 20C), an instruction to transfer the piece of PDL data selected by the user to the image forming device 20A, together with the IP address of the image forming device 20A, by using the communication unit 23A. The instruction includes the PDL identifier associated with the selected piece of PDL data and the user ID. The controller 21C of the image forming device 20C receives the instruction, and, if the specified piece of PDL data is stored in the memory 22C, reads out it and transfers it to the image forming device 20A to which the received IP address is assigned. If the specified piece of PDL data is not stored in the memory 22C, the controller 21C obtains the PDL identifier included in the specified piece of PDL data and the IP address associated with the user ID from the transfer information stored in the image forming device 20C. Then, the controller 21C transmits, to the image forming device 20 to which the obtained IP address is assigned, an instruction to transfer the specified piece of PDL data to the image forming device 20A. The image forming device 20 that has received the instruction performs a process similar to the above-described process performed by the image forming device 20C. That is, the process of searching for the image forming device 20 to which the specified piece of PDL data was transferred is continued until the specified piece of PDL data is obtained. Then, the controller 21 of the image forming device 20 that stores the specified piece of PDL data transfers the specified piece of PDL data, and stores the transfer information regarding the transferred piece of PDL data in the memory 22. Also, the controller 21 of the image forming device 20 deletes the transferred piece of PDL data from the memory 22. The controller 21A of the image forming device 20A, which has provided the instruction, performs output based on the received piece of PDL data.

Here, the image forming device 20 that has transferred the piece of PDL data in the above-described process (the image forming device 20C) may perform the following process. Upon determining that the memory 22C of the image forming device 20C has a sufficient free space at a predetermined timing, the controller 21C transmits an instruction to search for the piece of PDL data by using the user ID associated with the transfer destination and the PDL identifier as a key from the image forming device 20 as the transfer destination indicated by the IP address included in the transfer information, on the basis of the transfer information stored in the image forming device 20C. The image forming device 20 as the transfer destination performs a process similar to the above-described process performed by the image forming device 20C in the third modification. The controller 21C stores the piece of PDL data received as a search result in the memory 22C, and deletes the transfer information regarding the piece of PDL data.

Fourth Modification

The exemplary embodiment of the present invention may be specified as a computer readable medium storing a program causing a computer to function as a control device. The program may be provided by being recorded on a recording medium, such as an optical disc, or may be provided by causing the computer to download it via a communication medium, such as the Internet, so that the program may be installed in the computer and used in the computer.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising:
a plurality of image forming devices each of which forms an image corresponding to image data,
each of the plurality of image forming devices including
a memory that stores one or more pieces of image data,
a determining unit that determines whether or not usage of the memory of the image forming device is larger than a threshold,
a selecting unit that selects, if the determining unit determines that usage of the memory is larger than the threshold, a piece of image data to be transferred from among the pieces of image data stored in the memory,
a specifying unit that specifies a specific image forming device to which the piece of image data selected by the selecting unit is to be transferred among the other image forming devices, and
a transferring unit that transfers the piece of image data selected by the selecting unit to the specific image forming device specified by the specifying unit,
wherein the determining unit performs the determination at a time when the image forming device is operating in a power saving mode, when the memory of the image forming device stores the piece of image data.

2. The image forming system according to claim 1,
wherein the determining unit performs the determination at predetermined time, when the memory of the image forming device stores the piece of image data.

3. The image forming system according to claim 1,
wherein the selecting unit selects, from among the pieces of image data stored in the memory of the image forming device, a piece of image data for which an image has been formed a larger number of times in another image forming device among the other image forming devices than in the image forming device, or a piece of image data for which an image was last formed at the oldest date and time in the image forming device or in another image forming device among the other image forming devices, the selected piece of image data being the piece of image data to be transferred.

4. The image forming system according to claim 1,
wherein the specifying unit specifies, among the plurality of image forming devices, any of a specific image forming device in which usage of the memory is equal to or smaller than the threshold, a specific image forming device connected to a subnet shared by the image forming device if the plurality of image forming devices are connected to one another so as to be capable of communicating with one another, a specific image forming device whose facsimile function is effectively operating if any of the plurality of image forming devices has a facsimile function of transmitting and receiving a facsimile, a specific image forming device in which an elapsed time from power-on is shorter than a predetermined time period, and a specific image forming device which has formed an image corresponding to the piece of image data to be transferred a number of times larger than a predetermined number, the specified image forming device serving as a transfer destination.

5. An image forming device comprising:
a memory that stores one or more pieces of image data;
an image forming unit that forms an image corresponding to a piece of image data among the pieces of image data stored in the memory;
a determining unit that determines, if usage of the memory of the image forming device is larger than a threshold, that a piece of image data among the pieces of image data is to be transferred from the memory of the image forming device to another image forming device;
a selecting unit that selects, if the determining unit determines that a piece of image data among the pieces of image data is to be transferred to the other image forming device, the piece of image data to be transferred from among the pieces of image data stored in the memory of the image forming device;

a specifying unit that specifies the other image forming device to which the piece of image data selected by the selecting unit is to be transferred; and a transferring unit that transfers the piece of image data selected by the selecting unit to the other image forming device specified by the specifying unit, wherein the determining unit performs the determination at a time when the image forming device is operating in a power saving mode, when the memory of the image forming device stores the piece of image data.

6. An image forming method comprising:

storing one or more pieces of image data in a memory of an image forming device;

determining whether or not usage of the memory is larger than a threshold;

selecting, if the determining determines that usage of the memory is larger than the threshold, a piece of image data to be transferred from among the pieces of image data stored in the memory;

specifying another image forming device to which the selected piece of image data is to be transferred; and transferring the selected piece of image data to the specified other image forming device, wherein the determining is performed at a time when the image forming device is operating in a power saving mode, when the memory of the image forming device stores the piece of image data.

7. A non-transitory computer readable medium storing a program causing a computer to execute a process, the computer being provided in an image forming device which includes a memory that stores one or more pieces of image data and which forms an image corresponding to a piece of image data among the pieces of image data stored in the memory, the process comprising:

determining whether or not usage of the memory is larger than a threshold;

selecting, if the determining determines that usage of the memory is larger than the threshold, a piece of image data to be transferred from among the pieces of image data stored in the memory;

specifying another image forming device to which the selected piece of image data is to be transferred; and transferring the selected piece of image data to the specified other image forming device, wherein the determining is performed at a time when the image forming device is operating in a power saving mode, when the memory of the image forming device stores the piece of image data.

* * * * *